(12) United States Patent
Sgriccia et al.

(10) Patent No.: US 10,074,456 B2
(45) Date of Patent: Sep. 11, 2018

(54) DIELECTRIC GLASS COMPOSITION

(71) Applicant: Heraeus Precious Metals North America Conshohocken LLC, West Conshohocken, PA (US)

(72) Inventors: Matthew Sgriccia, Douglassville, PA (US); Mark Challingsworth, Glenside, PA (US); Samson Shahbazi, Roslyn, PA (US); Ryan Persons, Newtown Square, PA (US); Steven Grabey, Hazleton, PA (US)

(73) Assignee: Heraeus Precious Metals North America Conshohocken LLC, West Conshohocken, PA (US)

( * ) Notice: Subject to any disclaimer, the term of this patent is extended or adjusted under 35 U.S.C. 154(b) by 458 days.

(21) Appl. No.: 14/725,660

(22) Filed: May 29, 2015

(65) Prior Publication Data

US 2015/0348672 A1  Dec. 3, 2015

Related U.S. Application Data

(60) Provisional application No. 62/006,942, filed on Jun. 3, 2014.

(30) Foreign Application Priority Data

Jun. 3, 2014  (EP) .................................... 14171020

(51) Int. Cl.

| | | |
|---|---|---|
| *C03C 8/02* | (2006.01) | |
| *C03C 8/24* | (2006.01) | |
| *C03C 3/062* | (2006.01) | |
| *C03C 3/083* | (2006.01) | |
| *H01B 3/08* | (2006.01) | |
| *H01B 19/02* | (2006.01) | |
| *C03C 3/064* | (2006.01) | |
| *C03C 3/091* | (2006.01) | |
| *C03C 4/16* | (2006.01) | |
| *C03C 8/16* | (2006.01) | |
| *C03C 8/20* | (2006.01) | |
| *H01G 4/10* | (2006.01) | |
| *H01G 4/12* | (2006.01) | |
| *H01C 17/065* | (2006.01) | |

(52) U.S. Cl.

CPC ............. *H01B 3/087* (2013.01); *C03C 3/062* (2013.01); *C03C 3/064* (2013.01); *C03C 3/091* (2013.01); *C03C 4/16* (2013.01); *C03C 8/16* (2013.01); *C03C 8/20* (2013.01); *H01B 19/02* (2013.01); *H01G 4/105* (2013.01); *H01G 4/129* (2013.01); *C03C 2207/08* (2013.01); *H01C 17/06533* (2013.01)

(58) Field of Classification Search

CPC .... C03C 4/16; C03C 8/02; C03C 8/16; C03C 3/062; C03C 3/064; C03C 3/076; C03C 3/089; C03C 3/091; H01B 3/087

See application file for complete search history.

(56) References Cited

U.S. PATENT DOCUMENTS

| | | | | |
|---|---|---|---|---|
| 5,308,803 | A * | 5/1994 | Clifford | .................. C03C 3/068 428/701 |
| 5,633,090 | A * | 5/1997 | Rodek | ....................... C03C 8/02 428/426 |
| 6,733,891 | B1 | 5/2004 | Blair et al. | |
| 7,192,602 | B2 * | 3/2007 | Fechner | ................. A01N 25/08 424/405 |
| 7,341,964 | B2 * | 3/2008 | Emlemdi | .................. C03C 8/04 501/14 |
| 7,816,292 | B2 * | 10/2010 | Zimmer | ................. B82Y 30/00 424/489 |
| 9,315,413 | B2 * | 4/2016 | Singh | ...................... C03C 3/089 |
| 2004/0077477 | A1 | 4/2004 | Gazo | |
| 2007/0225154 | A1 | 9/2007 | Yanagida et al. | |
| 2011/0129679 | A1 | 6/2011 | Svetlana et al. | |
| 2013/0112261 | A1 | 5/2013 | Lixin et al. | |
| 2015/0348672 | A1 | 12/2015 | Sgriccia et al. | |

FOREIGN PATENT DOCUMENTS

| | | | | |
|---|---|---|---|---|
| CN | 101593654 | A | 12/2009 | |
| EP | 1 480 233 | A1 | 11/2004 | |
| EP | 2 157 062 | A1 | 2/2010 | |
| GB | 2 371 775 | A | 8/2002 | |
| JP | H04175243 | A | 6/1992 | |
| JP | H04187540 | A | 7/1992 | |
| JP | H05270860 | A | 10/1993 | |
| JP | H10 158032 | A | 6/1998 | |
| JP | 11120823 | | * 4/1999 | |
| JP | 201184447 | | 4/2011 | |
| JP | 2012500765 | A | 1/2012 | |
| WO | WO-2013126369 | A1 * | 8/2013 | ............... C03C 8/04 |

\* cited by examiner

*Primary Examiner* — Karl E Group

(74) *Attorney, Agent, or Firm* — Charles R. Wolfe, Jr.; Cole T. Duncan

(57) ABSTRACT

A dielectric glass composition suitable for use in an electronic device which comprises a sufficient amount of silicon dioxide to impart durability to the glass composition when subject to a humid environment, and one or more alkali metal oxides, wherein (i) the total content of the alkali metal oxides is at least about 10 wt % and no more than about 35 wt %, based upon 100% total weight of the glass composition, (ii) the median particle size ($d_{50}$) of the glass composition is no more than about 5 μm, and (iii) the glass composition has a coefficient of thermal expansion of at least about 10 ppm/K and no more than about 25 ppm/K, is provided.

19 Claims, No Drawings

DIELECTRIC GLASS COMPOSITION

This application claims priority under 35 U.S.C. § 119 to U.S. Provisional Application No. 62/006,942 filed Jun. 3, 2014 and European Patent Application 14 171 020.0 filed Jun. 3, 2014, the entire disclosures of which are hereby incorporated by reference.

TECHNICAL FIELD

The invention is directed to dielectric glass compositions which are preferably lead-free. The compositions are particularly useful in forming dielectric layers for thermal management in electronic assemblies and devices.

BACKGROUND

Traditional metal core printed circuit boards (PCBs) are useful in a variety of applications due to their ability to dissipate heat away from electronic components, such as, for example, LEDs. Metal core PCBs are generally formed of a base metal, typically aluminum, copper, or alloys thereof, that acts as a heat sink to dissipate heat away from the integral electronic components of the PCB. Metal cores are often used as an alternative to common FR4 boards (fiberglass/epoxy composition material) or CEM3 circuit boards (polytetrafluoroethylene) because of their superior ability to dissipate heat. Typically, the metal core is applied to a surface of a metal heat sink, a dielectric layer (which is electrically insulating) is then applied to the surface of the metal core, and the electronic components are applied to the dielectric layer.

Conventional metal cores do not provide a great deal of versatility in the design of the metal core layer, as they are typically formed as a solid metal layer. To solve this problem, dielectric paste compositions have been formulated. These pastes may be printed directly onto the substrate in any desired pattern, thereby providing versatility in design and reducing material waste. However, known dielectric pastes do not exhibit durability at elevated humidity levels. The invention provides a dielectric glass composition which may be used as an alternative to the standard metal cores and known dielectric compositions. The inventive compositions exhibit exceptional heat dissipation, electrical performance and adhesion to the underlying substrate, while also maintaining durability at elevated humidity levels. Furthermore, the dielectric glass compositions of the invention allow for the efficient formation of hybrid thick film circuits by printing and firing various thick film materials, such as conductors, resistors, dielectrics, and the like in less manufacturing steps.

SUMMARY

The invention provides a dielectric glass composition suitable for use in an electronic device comprising a sufficient amount of silicon dioxide to impart durability to the glass composition when subject to a humid environment, and one or more alkali metal oxides. The total content of the alkali metal oxides is at least about 10 wt % and no more than about 35 wt %, based upon 100% total weight of the glass composition. The median particle size ($d_{50}$) of the glass composition is at least about 2 µm and no more than about 5 µm, and the glass composition has a coefficient of thermal expansion of at least about 10 ppm/K and no more than about 25 ppm/K.

The invention also provides a dielectric glass composition suitable for use in an electronic device comprising at least about 30 wt % silicon dioxide, at least about 10 wt % and no more than about 35 wt % of one or more alkali metal oxides, no more than about 30 wt % bismuth oxide, no more than about 5 wt % boron oxide, at least about 1 wt % and no more than about 10 wt % vanadium oxide, and at least about 0.1 wt % and no more than about 5 wt % aluminum oxide, based upon 100% total weight of the glass composition, wherein the median particle size ($d_{50}$) of the glass composition is at least about 2 µm and no more than about 5 µm.

Another aspect of the invention is a dielectric paste composition suitable for use in an electronic device comprising the dielectric glass compositions of the invention and an organic vehicle. The invention also provides a method of applying the dielectric paste composition to at least one surface of a substrate.

The invention also provides an electronic device comprising a substrate which has at least one surface and the dielectric paste composition of the invention applied to at least a portion of at least one surface to form a dielectric layer. The paste composition may be fired on the substrate so as to remove the organic layer and form the dielectric layer.

DETAILED DESCRIPTION

As set forth herein, the invention is directed to dielectric glass compositions suitable for use in forming dielectric layers in electronic devices. Dielectric glass compositions should have sufficient insulation resistance and breakdown voltage such that they electrically isolate the electronic components of the circuit from the metal substrate. In one embodiment, the dielectric glass compositions are combined with at least one organic vehicle to form a dielectric glass composition as set forth herein. The dielectric paste composition may then be directly applied to a substrate to form a dielectric layer. The dielectric paste compositions should adhere well to the substrate and should exhibit durability in environments with elevated humidity (for example, at 85% relative humidity).

Dielectric Glass Composition

The dielectric glass component is preferably provided in the form of a glass frit. The glass frit preferably includes a variety of oxides which each provide certain characteristics to the glass composition. At a minimum, the glass frit preferably includes silicon dioxide and one or more alkali metal oxides. The silicon dioxide imparts the dielectric glass composition with sufficient durability when the glass is subjected to a humid environment (for example, an environment with at least 85% relative humidity). This is important where the dielectric glass will be incorporated into an electronic device that is used outside and is exposed so a variety of weather elements. The alkali metal oxides provide the composition with a beneficial increase in its coefficient of thermal expansion (CTE). When a dielectric paste composition (which includes the dielectric glass set forth herein) is applied directly to a substrate, it is preferred that the composition have a CTE, that is less than or equal to that of the substrate, such that when the assembly is subjected to heating and subsequent cooling, the materials expand and contract at similar rates and are less likely to crack or bow. The CTE of the composition should not be significantly less than the CTE of the substrate, or else under stresses that result in cracking or bowing may occur. The alkali metal oxides increase the CTE of the glass composition, which provides the glass with a CTE more similar to the substrate. The silicon dioxide and alkali metal oxide components should be carefully balanced, however, as high silicon dioxide content reduces CTE and low alkali metal oxide content has a detrimental effect on durability. Thus, the dielectric glass composition preferably includes a sufficient amount of silicon dioxide to impart durability to the glass composition. In one embodiment, the glass composition includes at least about 30 wt % silicon dioxide, and preferably at least about 40 wt %, based upon 100% total weight of the glass composition. Further, the glass composition preferably includes one or more alkali metal oxides, such that the total alkali metal oxide content is at least about 10 wt %, based upon 100% total weight of the glass composition. At the same time, the total alkali metal oxide content is preferably no more than about 35 wt %, and preferably no more than about 20 wt %, based upon 100% total weight of the glass composition.

In one embodiment, the alkali metal oxides include as least one of sodium oxide (e.g., $Na_2O$), potassium oxide (e.g., $K_2O$), and lithium oxide (e.g., $Li_2O$).

In a preferred embodiment, the glass composition is lead-free. As set forth herein, the term "lead-free" means that the glass composition has less than 0.5 wt % lead based upon 100% total weight of the glass composition.

The dielectric glass composition may also include other oxides which impart the glass with improved electrical performance, adhesion, and durability. Suitable oxides include, but are not limited to, metal or metalloid oxides such as bismuth oxide, boron oxide, vanadium oxide, aluminum oxide, titanium oxide, barium oxide, antimony oxide, zinc oxide, manganese oxide, tellurium oxide, copper oxide, and combinations thereof. These oxides or a combination thereof are preferably present in the glass composition (in total) at an amount of at least about 10 wt %, preferably as least about 20 wt %, and most preferably at least about 30 wt %, based upon 100% total weight of the paste. At the same time, the additional oxides are preferably no more than about 60 wt %, preferably no more than about 50 wt %, and most preferably no more than about 45 wt %.

In one embodiment, the glass frit includes at least about 30 wt % silicon dioxide, at least about 10 wt % of one or more alkali metal oxides, and at the same time no more than about 35 wt % alkali metal oxides, no more than about 30 wt % bismuth oxide, no more than about 5 wt % boron oxide, at least about 1 wt % vanadium oxide, and at the same time no more than about 10 wt % vanadium oxide, and a least about 0.1 wt % aluminum oxide, and at the same time no more than about 5 wt % aluminum oxide.

As et forth above, the CTE of the glass composition is preferably equal to or less than the CTE of the substrate to which the glass composition is applied. In one embodiment, the glass composition has a CTE of at least about 10 ppm/K, preferably at least 12 ppm/K, which is similar to a standard steel substrate. At the same time, the glass has a CTE of preferably no more than 25 ppm/K, which is more similar to a standard aluminum substrate.

As set forth herein, the CTE is measured using a thermal mechanical analyzer (TMA). Measurements are conducted from pellets pressed from the glass powder created from grinding or milling of the glass. While dependent on the glass transition temperature, the CTE is typically measured between 30° C.-40° C. and 300° C.-350° C. at a heating rate of 5° C./minute to 10° C./minute. First, a pellet is formed from the powder created from milling a desired glass composition. About 0.5-1 grams (based on a density of 3.05 $g/cm^3$) is added to fill a 6 mm (inside diameter) pellet die. Using a Carver Hydraulic Press (manufactured by Carver, Inc. of Wabash, Ind.), the powder is pressed with a force of about 130-150 lbs. (2950-3425 psi) for 60 seconds. Using a TA instrument TMA Q400em (manufactured by TA Instruments of New Castle, Del.) and corresponding Universal Analysis 2000 software, the pellet height is measured and the pellet is pre-fired from 40-350° C. in air (below the glass transition temperature) at a rate of 10° C./minute with an applied probe force of 0.2 Newtons. The pellet is allowed to cool to 40° C. The pellet height is re-measured and the pellet is then heated to a temperature of 460° C. (just beyond the softening point) at a rate of 5° C./minute. The CTE is then calculated by the software.

Another important characteristic of the lass frit is the glass transition temperature ($T_g$). At the $T_g$ of a material, the amorphous substance transforms from a rigid solid to a partially mobile undercooled melt. The glass transition temperature may be determined by Differential Scanning Calorimetry (DSC) using an SDT Q600 instrument and corresponding Universal Analysis 2000 software, both available from TA Instruments-Waters LLC of New Castle, Del. An amount of about 20-30 mg of the sample is weighed into the sample pan with an accuracy of about 0.01 mg. The empty reference pan and the sample pan are placed in the apparatus, the oven is closed, and the measurement started. A heating rate of 10° C./min is employed from a starting temperature of 25° C. to an end temperature of 1000° C. The first step in the DSC signal is evaluated as the glass transition temperature $T_g$ using the software described above, and the determined onset value is taken as the temperature for $T_g$.

The desired $T_g$ of the glass frit is preferably no more than about 470° C., and most preferably no more than about 450° C.

Another important characteristic of the glass frit is the glass softening temperature. The glass softening temperature marks the temperature at which the glass material begins to soften beyond some arbitrary softness, or the maximum temperature at which a glass can be handled without permanent deformation. As set forth herein, the glass softening temperature is measured at the same manner as CTE (set forth above). Specifically, the softening temperature may be calculated by the TA Instrument TMA Q400em equipment and corresponding software under the same testing parameters. The softening temperature represents the onset temperature where the material experiences a sharp change from increasing (expansion) to decreasing dimension change. The glass softening temperature is preferably no more than about 500° C., and most preferably no more than about 470° C.

The glass frit particles can exhibit a variety of sizes and surface areas. One way to characterize the size of the glass frit particles is the median particle diameter ($d_{50}$). Median particle diameter ($d_{50}$) is a characteristic of particles well known to the person skilled in the art. The $d_{50}$ is the median diameter or the medium value of the particle size distribution. It is the value of the particle diameter at 50% in the cumulative distribution. Particle size distribution may be measured via laser diffraction, dynamic light scattering, imaging, electrophoretic light scattering, particle sedimentation, or any other method known in the art. As set forth herein, a Horiba LA-910 Laser Diffraction Particle Size Analyzer connected to a computer with a LA-90 software program is used to determine the median particle diameter of the glass frit particles. The relative refractive index of the glass frit particle is chosen from the LA-910 manual and entered into the software program. The test chamber is filled with deionized water or isopropyl alcohol (IPA) to the proper fill line on the tank. The solution is then circulated by using the circulation and agitation functions in the software program. After one minute, the solution is drained. This is repeated an additional time to ensure the chamber is clean of any residual material. The chamber is then filled with deionized water or IPA for a third time and allowed to circulate and agitate for one minute. Any background particles in the solution are eliminated by using the blank function in the software. The glass powder (dry or dispersed in water or IPA) is slowly added to the solution in the test chamber until the transmittance bars are in the proper zone to the software program. Once the transmittance is at the correct level, ultrasonic agitation is started and run for 30 seconds to prevent agglomeration. After the ultrasonic agitation has stopped, the laser diffraction analysis is run and the particle size distribution of the glass frit component is measured and given as $d_{50}$.

It is preferred that the median particle diameter ($d_{50}$) of the glass frit particles is at least about 1 µm, and preferably at least about 2 µm, and most preferably at least about 3 µm. At the same time, the $d_{50}$ is preferably no more than about 10 µm, preferably no more than about 7 µm, and more preferably no more than about 5 µm. In a most preferred embodiment, the median particle diameter ($d_{50}$) of the glass frit particles is no more than about 5 µm.

Another way to characterize the shape and size of a glass frit particle is by its specific surface area. Specific surface area is a property of solids equal to the total surface area of the material per unit mass, solid or bulk volume, or cross sectional area. It is defined either by surface area divided by mass (with units of $m^2/g$ or $m^2/kg$), or surface area divided by the volume (units of $m^2/m^3$ or $m^{-4}$. The lowest value for the specific surface area of a particle is embodied by a sphere with a smooth surface. The less uniform and uneven a shape is, the higher its specific surface area will be. The specific surface area (surface area per unit mass) may be measured by the BET (Brunauer-Emmett-Teller) method, which is known in the art. Specifically, BET measurements are made in accordance with DIN ISO 9277; 1995. A Monosorb Model MS-22 instrument (manufactured by Quantachrome Instruments), which operates according to the SMART method (Sorption Method with Adaptive dosing Rate), is used for the measurement. As a reference material, aluminum oxide (available from Quantachrome Instruments as surface area reference material Cat. No. 2003) is used. Samples are prepared for analysis in the built-in degas station. Flowing gas (30% $N_2$ and 70% He) sweeps away impurities, resulting in a clean surface upon which adsorption may occur. The sample can be heated to a user-selectable temperature with the supplied heating mantle. Digital temperature control and display are mounted on the instrument front panel. After degassing is complete, the sample cell is transferred to the analysis station. Quick connect fittings automatically seal the sample cell during transfer, and the system is then activated to commence the analysis. A dewar flask filled with coolant is manually raised, immersing the sample cell and causing adsorption. The instrument detects when adsorption is complete (2-3 minutes), automatically lowers the dewar flask, and gently heats the sample cell back to room temperature using a built-in hot-air blower. As a result, the desorbed gas signal is displayed on a digital meter and the surface area is directly presented on a front panel display. The entire measurement (adsorption and desorption) cycle typically requires less than six minutes. The technique uses a high sensitivity, thermal conductivity detector to measure the change in concentration of an adsorbate/inert carrier gas mixture as adsorption and desorption proceed. When integrated by the on-board electronics and compared to calibration, the detector provides the volume of gas adsorbed or desorbed. For the adsorptive measurement, % $N_2$ 5.0 with a molecular cross-sectional area of 0.162 $nm^2$ at 77K is used for the calculation. A one-point analysts is performed and a built-in microprocessor ensures linearity and automatically computes the sample's BET surface area in $m^2/g$.

The glass frit particles preferably have a specific surface area of at least about 1 $m^2/g$, preferably at least about 1.5 $m^2/g$, and most preferably at least about 2 $m^3/g$. At the same time, the specific surface area is preferably no more than about 3 $m^2/g$, more preferably no more than about 2.5 $m^2/g$.

Dielectric Paste Composition

The dielectric glass compositions of the invention are useful for forming dielectric paste compositions. Such dielectric paste compositions may be used to form dielectric layers in electronic assemblies, such as LEDs. The dielectric paste composition preferably includes the dielectric glass composition discussed herein, as well as an organic vehicle. In at least one embodiment, the dielectric paste composition may also include additives outside of the glass component or organic vehicle component.

The Dielectric paste composition preferably includes at least about 50 wt % of the dielectric glass composition, preferably at least about 55 wt %, and more preferably at least about 65 wt %, based upon 100% total weight of the paste composition. At the same time, the paste preferably includes no more than about 80 wt % dielectric glass, preferably no more than about 75 wt % and most preferably no more than about 70 wt %, based upon 100% total weight of the paste composition.

Organic Vehicle

The organic vehicle provides the medium through which the dielectric component is applied to the substrate. It imparts the desired viscosity and rheology to the dielectric composition, which allows the composition to be applied to the substrate via a number of application methods to form a variety of desired patterns. Organic vehicles used in dielectric compositions typically include a combination of solvents, binders, and resins to produce desired flow properties, drying behavior, and green strength for a given application. At a minimum, the organic vehicle includes at least one binder and at least one solvent. The organic vehicle may optionally include additive(s) as well, such as surfactants, plasticizers, and thixotropic agents.

In one embodiment, the dielectric paste composition includes at least about 10 wt % organic vehicle, preferably at least about 15 wt %, and most preferably at least about 20 wt %, based upon 100% total weight of the paste composition. At the same time, the dielectric paste composition includes no more than about 40 wt % organic vehicle, preferably no more than about 35 wt %, and most preferably no more than about 30 wt %, based upon 100% total weight of the paste composition.

Preferred binders are those which contribute to the formation of a dielectric composition with favorable printability, electrical properties, and adhesion. Preferably, the binder has a curing temperature that is compatible with the substrate. Preferred binders are polymeric binders, monomeric binders, and binders which are a combination of polymers and monomers. Polymeric binders can also be copolymers wherein at least two different monomeric units are contained in a single molecule. Preferred polymeric binders are those which carry functional groups in the polymer main chain, those which carry functional groups off of the main chain and those which carry functional groups both within the main chain and off of the main chain. Preferred polymers carrying functional groups in the main chain are for example polyesters, substituted polyesters, polycarbonates, substituted polycarbonates, polymers which carry cyclic groups in the main chain, poly-sugars, substituted poly-sugars, polyurethanes, substituted polyurethanes, polyamides, substituted polyamides, phenolic resins, substituted phenolic resins, copolymers of the monomers of one or more of the preceding polymers, optionally with other co-monomers, or a combination of at least two thereof. According to one embodiment, the binder may be polyvinyl butyral or polyethylene. Preferred polymers which carry cyclic groups in the main chain are for example polyvinylbutylate (PVB) and its derivatives and poly-terpineol and its derivatives or mixtures thereof. Preferred poly-sugars include, for example, cellulose and alkyl derivatives thereof, preferably methyl cellulose, ethyl cellulose, hydroxyethyl cellulose, propyl cellulose, hydroxypropyl cellulose, butyl cellulose and their derivatives and mixtures of at least two thereof. Other preferred polymers are cellulose ester resins, e.g., cellulose acetate propionate, cellulose acetate butyrate, and any combinations thereof. Preferred polymers which carry functional groups off of the main polymer chain are those which carry amide groups, those which carry acid and/or ester groups, often called acrylic resins, or polymers which carry a combination of aforementioned functional groups, or a combination thereof. Preferred polymers which carry amide off of the main chain are for example polyvinyl pyrrolidone (PVP) and its derivatives. Preferred polymers which carry acid and/or ester groups off of the main chain include, for example, polyacrylic acid and its derivatives, polymethacrylate (PMA) and its derivatives or polymethylmethacrylate (PMMA) and its derivatives, or a mixture thereof. Preferred monomeric binders include, for example, ethylene glycol based monomers, terpineol resins or resin derivatives, or a mixture thereof. Preferred monomeric binders based on ethylene glycol include those with ether groups, ester groups or those with an ether group and an ester group, preferred ether groups being methyl, ethyl, propyl, butyl, pentyl hexyl and higher alkyl ethers, the preferred ester group being acetate and its alkyl derivatives, preferably ethylene glycol monobutylether monoacetate or a mixture thereof. The binder may be present in an amount of at least about 0.1 wt %, preferably at least about 0.5 wt %, and most preferably at least about 1 wt %, based upon 100% total weight of the dielectric composition. At the same time, the binder may be present in an amount of no more than about 20 wt %, preferably no more than about 10 wt %, and more preferably no more than about 5 wt %, based upon 100% total weight of the dielectric composition.

Any solvent known in the art may be used in the dielectric composition. Preferred solvents include, but are not limited to, polar or non-polar, protic or aprotic, aromatic or non-aromatic compounds, and may be mono-alcohols, di-alcohols, poly-alcohols, mono-esters, di-esters, poly-esters, mono-ethers, di-ethers, poly-ethers, solvents which comprise at least one or more of these categories of functional groups, optionally comprising other categories of functional groups, preferably cyclic groups, aromatic groups, unsaturated bonds, alcohol groups with one or more O atoms replaced by heteroatoms (such as N atoms), ether groups with one or more O atoms replaced by heteroatoms (such as N atoms), esters groups with one or more O atoms replaced by heteroatoms (such as N atoms), and mixtures of two or more of the aforementioned solvents. Preferred esters in this context include, but are not limited to, di-alkyl esters of adipic acid, preferred alkyl constituents including methyl, ethyl, propyl, butyl, pentyl, hexyl and higher alkyl groups or combinations of two different such alkyl groups, preferably dimethyladipate, and mixtures of two or more adipate esters. Preferred ethers in this context include, but are not limited to, diethers, such as dialkyl ethers of ethylene glycol and mixtures of two diethers. The alkyl constituents in the dialkyl ethers of ethylene can be, for example, methyl, ethyl, propyl, butyl, pentyl, hexyl and higher alkyl groups or combinations of two different such alkyl groups. Preferred alcohols in this context include, but are not limited to, primary, secondary and tertiary alcohols, preferably tertiary alcohols, terpineol and its derivatives being preferred, or a mixture of two or more alcohols. Preferred solvents which combine more than one functional group include, but are not limited to, (i) 2,2,4-trimethyl-1,3-pentanediol monoisobutyrate, often called texanol, and its derivatives, (ii) 2-(2-ethoxyethoxy)ethanol, also known as carbitol, its alkyl derivatives, preferably methyl, ethyl, propyl, butyl, pentyl, and hexyl carbitol, preferably hexyl carbitol or butyl carbitol, and acetate derivatives thereof, preferably butyl carbitol acetate, or (iii) mixtures of at least two of the aforementioned. In one embodiment, the dielectric composition comprises at least about 10 wt % solvent, preferably at least about 15 wt %, and most preferably at least about 20 wt %, based open 100% total weight of the dielectric composition. At the same time, the solvent(s) may be present in an amount of no more than about 50 wt %, preferably no more than about 40 wt %, and most preferably no more than about 30 wt %, based upon 100% total weight of the dielectric composition.

The organic vehicle may also comprise one or more additives. Preferred additives in the vehicle are those which are distinct from the aforementioned vehicle components and which contribute to favorable viscosity and rheology of the dielectric composition. Preferred additives include, but are not limbed to, surfactants, plasticizers, thixotropic agents, viscosity regulators, stabilizing agents, inorganic additives, thickeners, hardeners, diluents, emulsifiers, dispersants, pH regulators, and any combination thereof.

All surfactants which are known in the art, and which are considered to be suitable in the context of this invention, may be employed as the surfactant in the organic vehicle. Preferred surfactants include, but are not limited to, those based on linear chains, branched chains, aromatic chains, fluorinated chains, siloxane chains, polyether chains and combinations thereof. Preferred surfactants include, but are not limited to, single chained, double chained or poly chained. Suitable surfactants include, but are not limited to, non-ionic, anionic, cationic, amphiphilic, or zwitterionic compounds. Preferred surfactants include, but are not limited to, polymeric or monomeric or a mixture thereof. Preferred surfactants may have pigment affinic groups, preferably hydroxyfunctional carboxylic acid esters with pigment affinic groups (e.g., DISPERBYK®-108, manufactured by BYK USA, Inc.), DISPERBYK®-110 (manufactured by BYK USA, Inc.), acrylate copolymers with pigment affinic groups (e.g., DISPERBYK®-116, manufactured by BYK USA, Inc.), modified polyethers with pigment affinic groups (e.g., TEGO® 655, manufactured by Evonik Tego Chemie GmbH), or other surfactants with groups of high pigment affinity (e.g., TEGO® DISPERS 662 C, manufactured by Evonik Tego Chemie GmbH). Other preferred polymers include, but are not limited to, polyethylene glycol and its derivatives, and alkyl carboxylic acids and their derivatives or salts, or mixtures thereof. A preferred polyethylene glycol derivative is poly(ethylene glycol) acetic acid. Preferred alkyl carboxylic acids are those with fully saturated and those with singly or poly unsaturated alkyl chains or mixtures thereof. Preferred carboxylic acids with saturated alkyl chains are those with alkyl chain lengths in the range from about 8 to about 20 carbon atoms, preferably $C_4H_{19}COOH$ (capric acid), $C_{11}H_{23}COOH$ (lauric acid), $C_{10}H_{27}COOH$ (myristic acid) $C_4H_{31}COOH$ (palmitic acid), $C_{17}H_{35}COOH$ (stearic acid) or mixtures thereof. Preferred carboxylic acids with unsaturated alkyl chains include, but are not limited to, $C_{18}H_{34}O_2$ (oleic acid) and $C_{18}H_{32}O_2$ (linoleic acid). In one embodiment, the surfactant may include SOLSPERE® 41000 or SOLSPERE® 66000 manufactured by Lubrizol Advanced Materials of Cleveland, Ohio. The surfactant may be present in an amount of at least about 0.1 wt %, preferably at least about 1 wt %, based upon 100% total weight of the dielectric composition. At the same time, the surfactant is preferably present in an amount of no more than about 10 wt %, preferably no more than about 8 wt %, and most preferably no more than about 5 wt %.

Plasticizers increase the plasticity, fluidity, and flexibility of the dielectric composition, allowing for more efficient application to the substrate. Any plasticizer known in the art that is compatible with the other vehicle components may be used. Preferred plasticizers include, but are not limited to, propanol oxybis-dibenzoate, hydrogenated resin ester (e.g., Hercolyn® D manufactured by Pinova, Inc. of Brunswick, Ga.), and epoxidized octyl tallate (e.g., Drapex® 4.4 manufactured by Galata Chemicals of Southbury, Conn.). The plasticizer may be present in an amount of at least about 1 wt %, preferably at least about 2 wt %, and most preferably at least about 4 wt %, based upon 100% total weight of the dielectric composition. At the same time, the plasticizer is preferably present in an amount of no more than about 15 wt %, preferably no more than about 10 wt %, and preferably no more than about 8 wt %.

Thixotropic agents prevent the dielectric composition from excessive spreading when deposited onto a substrate surface, which is helpful in achieving desired film thickness. Thixotropic agents also induce shear thinning behavior, which leads to improved printability. Any thixotropic agent known in the art that is compatible with the other vehicle components may be used. Preferred thixotropic agents include, but are not limited to, carboxylic acid derivatives, preferably fatty acid derivatives or combinations thereof. Preferred fatty acid derivatives include, but are not limited to, saturated and unsaturated fatty acids, e.g., $C_8$-$C_{20}$ fatty acids, such as $C_9H_{19}COOH$ (capric acid), $C_{11}H_{33}COOH$ (lauric acid, $C_{12}H_{22}COOH$ (myristic acid) $C_{13}H_{31}COOH$ (palmitic acid), $C_{17}H_{33}COOH$ (stearic acid), $C_{1x}H_{34}O_2$ (oleic acid), $C_{18}H_{32}O_2$ (linoleic acid) or combinations thereof. A preferred combination comprising fatty acids in this context is castor oil. Additional thixotropic agents include, but are not limited to, Thixatrol® ST, Thixatrol® PLUS, and Thixatrol® MAX (manufactured by Elementis Specialties, Inc.). In a preferred embodiment, the dielectric composition includes at least one thixotropic agent, such as BYK®-410 (which contains 1-methyl-2-pyrrolidone and lithium chloride) available from BYK Additives Inc. of Austin. Tex. These components may be incorporated with the solvent and/or solvent/binder mixture, or they may be added directly into the dielectric composition. If present, the thixotropic agent is preferably at least about 0.1 wt % of the dielectric composition, based upon 100% total weight of the dielectric composition. At the same time, the thixotropic agent is preferably no more than about 2 wt % of the dielectric composition, preferably no more than about 1.5 wt %, and most preferably no more than about 1 wt %.

In one embodiment, the dielectric composition has a viscosity sufficient to form a thick film layer on a substrate. Viscosity is measured using a Brookfield® Model DV-III Programmable Rheometer. Specifically, the sample is measured in a 6R utility cup using a SC4-14 spindle, and the measurement is taken after one minute at 10 RPM. According to one embodiment, the dielectric composition has a viscosity of at least about 20 kcPs, preferably at least about 40 kcPs, and most preferably at least about 60 kcPs. At the same time, the dielectric composition preferably has a viscosity of no more than about 120 kcPs, and preferably no more than about 100 kcPs. In a most preferred embodiment, the dielectric past composition has a viscosity between 40 and 80 kcPs.

In one embodiment, the dielectric composition has a solids content sufficient to provide the desired appearance, electrical performance and fired film thickness of the dielectric layer. To measure the solids content, the weight of an uncoated substrate used for the particular application (e.g., steel or aluminum) is measured. Approximately one gram of paste is spread onto the substrate with a spatula. The weight of the coated substrate is again measured. The coated substrate is placed in a box oven at about 150° C. and dried for about 15-30 minutes. The coated part is fired according to the desired firing profile for the given application. The final weight of the fired coated substrate is again measured. The weight of the uncoated substrate is then subtracted from the weight of the wet coated substrate and front the weight of the fired coated substrate to calculate the weight of the wet film and the fired film, respectively. The solids content (in %) is calculated by dividing the fired film weight by the wet film weight. The solids content can also be determined by TGA (Thermal Gravimetric Analysis). In this method, a small amount of wet paste (e.g., at least 20 mg) is added to an alumina crucible. The crucible is heated at a pre-defined rate, typically about 10° C./minute or 20°/C. minute depending on the composition of the paste, to the desired peak temperature. The calculated residue remaining at the peak temperature represents the solids content of the paste. According to one embodiment, the dielectric composition has a solids content of at least 70%. At the same time, the composition preferably has a solids content of no more than 80%.

Additives

According to one embodiment, the dielectric glass composition may also include additives distinct from the glass component and the organic vehicle. Preferred additives contribute to the adhesive performance, electrical performance and durability of the dielectric glass composition. All additives known in the art may be employed as additives in the dielectric composition. Preferred additives include, but are not limited to, thixotropic agents, viscosity regulators, emulsifiers, stabilizing agents or pH regulators, inorganic additives, thickeners and dispersants, or a combination of at least two thereof. Inorganic additives are most preferred. Preferred inorganic additives include, but are not limited to, alkaline and alkaline earth metals and oxides thereof, transition metals such as nickel, zirconium, titanium, manganese, tin, ruthenium, cobalt, iron, copper, chromium, tungsten, molybdenum, zinc, post-transition metals such as boron, silicon, germanium, tellurium, gadolinium, lead, bismuth, and antimony, rare earth metals, such as lanthanum and cerium, oxides, mixed metal oxides, complex compounds, amorphous or partially crystallized glasses formed from those oxides, or any combination of at least two thereof.

In a preferred embodiment, the dielectric paste composition includes titania, ceramic pigments, transition metal oxides, or combinations thereof outside of the glass component. Suitable ceramic pigments include, bat are not limited to, Shepherd Black 430, Shepherd Black 376A, Shepherd Blue #3, and Shepherd Blue #11, all manufactured by The Shepherd Color Company of Cincinnati, Ohio. Transition metal oxides, for example chromium oxide ($Cr_2O_3$), may also be used. In one embodiment, combinations of titania and any of the above-referenced ceramic pigments may be used. If present, the dielectric paste composition includes at least about 1 wt % additive, and preferably at least about 5 wt %, and preferably at least 10 wt %, based upon 100% total weight of the composition. At the same time, the paste preferably includes no more than about 25 wt %, preferably no more than about 20 wt % additive(s), and most preferably no more than about 15 wt %, based upon 100% total weight of the composition.

Forming the Dielectric Paste Composition

To form the dielectric paste composition, the components of the organic vehicle are combined using any method known in the art for preparing an organic vehicle. The method preferably results in a homogenously dispersed composition. The glass frit particles and additive(s) (if present) are then mixed together with the organic vehicle according to any known method in the art, such as, for example, with a mixer. The composition is then preferably milled, for example, passed through a three roll mill to form a dispersed uniform paste composition.

Formation of Dielectric Layers

As set forth herein, the dielectric paste composition of the invention is useful in forming dielectric layers in an electronic device. An electronic device is generally comprised of a substrate and a variety of layers applied to the substrate having certain electrical/thermal properties. Any substrate known to one skilled in the art and suitable for use in any particular electronic application may be used. Suitable substrates may be chosen based upon such factors as temperature restriction, electrical, or mechanical properties. As set forth above, the CTE of the dielectric glass composition should be less than or equal to the CTE of the substrate to avoid cracking or bowing during heating/cooling. In one embodiment, the substrate has a CTE of at least about 10 ppm/K. At the same time, the substrate preferably has a CTE of no more than about 25 ppm/K. Preferably, the substrate is aluminum or steel.

The dielectric paste composition may be applied to at least one surface of the substrate using any known application methods, such as, for example, screen printing, stencil printing, tampon printing, dispensing from a nozzle, ink jet printing, spraying, slot die coating, curtain coating, roller coating, roll to roll processing, such as, for example, gravure, off-set gravure, dip coating, brushing, and any combination thereof. The dielectric composition may be applied in one layer or multiple layers to form a dielectric layer with a desired thickness. For example, the composition may be printed in multiple passes, whereby each layer is dried and fired before the next layer is printed. Preferably, one wet layer of printed dielectric paste composition should be at least about 50 microns thick. Once the paste is printed, it is allowed to level for approximately 10 minutes.

The dielectric composition is then preferably subjected to one or more thermal treatment steps, such as conventional oven drying, infrared or ultraviolet curing, and/or firing. According to one embodiment, the dielectric paste composition is first dried at a temperature of at least about 120° C. and preferably at least about 150° C., for about 15 minutes. The thickness of a single dried layer is preferably at least about 20 µm, and more preferably at least about 22 µm. At the same time, the thickness is preferably no more than about 30 µm, and preferably no more than about 27 µm. For application onto aluminum substrate, the paste is then fired in an air or nitrogen atmosphere at temperatures of at least about 500° C., preferably at least about 550° C., and moat preferably at least about 580° C. The firing temperature when an aluminum substrate is used should not exceed the melting temperature of aluminum (about 600° C.). For application onto a steel substrate, the paste may be fired in an air or nitrogen atmosphere at temperatures of at least about 500° C. At the same time, the firing temperature is preferably no more than about 1,000° C. The dielectric composition is preferably fired at peak temperature for at least about 2-3 minutes, and preferably at least about 5-7 minutes. At the same time, the dielectric composition is preferably fired at peak temperature for no more than about 25 minutes, and preferably no more than about 20 minutes.

In a preferred embodiment, one fired thick film layer has a thickness of at least about 12 µm, preferably at least about 15 µm, and most preferably at least about 17 µm. At the same time, one fired thick film layer preferably has a thickness of no more than about 25 µm, preferably no more than about 22 µm, and most preferably no more than about 20 µm. Where three dielectric layers are applied, the final fired thickness is preferably at least about 40 µm, more preferably at least about 45 µm, and most preferably at least about 50 µm. At the same time, the final fired thickness is preferably no more than about 70 µm, preferably no more than about 65 µm, and most preferably no more than about 60 µm.

An electric circuit may then be directly applied to an exposed surface of the fired dielectric thick film layer using any known application methods to form an electronic device. The dielectric paste composition on the invention may be used to form a variety of electronic devices, such as for example, an electric circuit, solar cell, LED, display, capacitor, resistor, or any combination thereof. The dielectric layer functions to dissipate heat away from the electronic component toward the substrate. In this way, the life of the electronic device may be extended.

Measuring Performance of the Dielectric Layers

The adhesive and electrical performance of the fired dielectric layers may be measured to ensure that they will meet application-specific standards. The adhesive performance of the dielectric layer is measured according to a standard pull force test using a Zwick Roell Z25 Testing Station machine available from Zwick GmbH & Co. KG. To prepare the test specimens, the test leads (formed of solder plated copper 60/40 tin) are first ultrasonically cleaned. The test pad (an 80 mil conductive adhesion pad) is deposited onto the test coupon. The test leads are attaching using one of two methods.

In a first method, leads are formed into Shepherds Crooks and attached to the conductive pads on the coupon. The test coupons are then dipped in either a mildly activated resin flux (RMA), non-activated resin flux (R), or activated resin flux (RA). The parts are then dipped in either a tin-lead solder (e.g., Sn62/Pb38/Ag2, Sn63/Pb37) at about 230° C. or a lead-free solder (e.g., Sn96.5/Ag3/Cu0.5 known as SAC, Sn95/Ag5) at about 250° C. The parts are immersed in the solder for three to five seconds to fully coat the pad. The solder joints are then cleaned using an appropriate solvent, preferably acetone, for several minutes before gently cleaning with a soft brush.

In a second method, the pads are pre-tinned with solder wire made of the same lead or lead-free solders described above using a solder iron at a temperature of about 230° C. or 250° C. (depending on the wire composition). While holding the test lead perpendicularly to the 80 mil pad, solder wire is added and the solder is re-melted on the pre-tinned pad using a solder iron. While holding the test lead, the solder iron is removed, and once the solder re-solidifies, the lead is released. The solder joints are then cleaned in the same manner described above. Before performing the pull test described above, the end of the Shepherds Crook hooked over the edge of the substrate is trimmed to create a flat bottom surface and the attached leads are bent to a 90° angle directly in front of the conductive pad. Each lead is trimmed to about two inches and the test part is then clamped into the grip of the Zwick testing machine. Each lead is pulled perpendicularly to the substrate until it separates from the test pad. The arm movement is set at a constant speed of 400 mm/minute with a grip separation of about 1.5 inches. The force at which the lead separates from the test pad is provided as the pull force (lbf). Typically, an initial pull force of about 4 lbf or greater is preferred in the industry.

To ensure that the dielectric layer exhibits desired electrical performance, a breakdown voltage and insulation resistance test is conducted using a Vitrek Dielectric Tester manufactured by Vitrek Corporation of Poway, Calif. Breakdown voltage is measured in either VDC or VAC units. Typical test recipes are prepared by attaching one electrode on a conductor (which is applied to a dielectric film) and attaching another electrode to an aluminum substrate. A voltage is then applied as the top conductor at a slew rate of 100 volts per second until a short or breakdown voltage is recorded. Preferably, a breakdown voltage of greater than 1,000 Volts per Mil and an insulation resistance of at least $10^9 \Omega$ are considered acceptable in the industry.

To determine the durability of the dielectric composition, each of the adhesion and electrical performance tests may be performed after the samples are subjected to elevated humidity. In one test, the fired dielectric layers are placed in a humidity chamber set at a temperature of 85° C. and relative humidity of 85%, in a thermal aging test, the temperature chamber is set at a temperature of about 150° C. and the samples are left in the chamber for a designated period of time.

The invention will now be described in conjunction with the following non-limiting examples.

Example 1

Five exemplary dielectric glass compositions were prepared. The individual components, which are provided in Table 1 below in weight percent of the glass composition, were mixed together and then heated for 60 minutes according to the parameters in Table 1. The fully melted glasses were then water quenched. The glasses were then ball milled to a median particle size ($d_{50}$) of less than 5 μm and a particle size $d_{90}$ of less than 10 μm. The particle size $d_{90}$ is the diameter at which approximately 90% of the particles in the cumulative distribution have a smaller diameter.

TABLE 1

Exemplary Glass Compositions G1-G5

|  | G1 | G2 | G3 | G4 | G5 |
|---|---|---|---|---|---|
| $Na_2O$ | 7.89 | 11.41 | 11.32 | 11.49 | 8.87 |
| $K_2O$ | 6.74 | 13.86 | 11.53 | 11.47 | 8.74 |
| $Li_2O$ | 2.15 | 6.05 | 3.59 | 3.57 | 3.62 |
| $TeO_2$ | — | — | — | — | 4.88 |
| $TiO_2$ | — | 16.01 | 16.07 | 16.03 | 15.96 |
| $Bi_2O_3$ | 25.13 | — | — | 4.83 | 5.34 |
| $B_2O_3$ | 2.36 | — | 4.98 | — | — |
| $V_2O_5$ | 4.39 | 6.62 | 6.63 | 6.64 | 6.60 |
| $Sb_2O_3$ | — | 2.94 | 2.89 | 2.76 | 2.89 |
| BaO | — | 3.86 | 3.86 | 3.73 | 3.80 |
| $SiO_2$ | 48.69 | 38.23 | 37.90 | 38.28 | 38.13 |
| $Al_2O_3$ | 2.65 | 1.03 | 1.24 | 1.20 | 1.17 |
| Firing Parameters | Melted at 1250° C. | Melted at 1150° C. | Melted at 1150° C. | Melted at 1150° C. | Melted at 1200° C. |

Thermal analysis was then conducted on the glasses to determine their glass transition temperature, glass softening temperature, and coefficient of thermal expansion according to the parameters set forth herein. The results are provided in Table 2 below.

TABLE 2

Thermal Analysis of Glasses G1-G5

|  | Glass Transition (° C.) | Softening Temperature (° C.) | CTE (ppm/K) |
|---|---|---|---|
| G1 | 429 | 456 | 11.96 |
| G2 | 407 | 435 | 15.99 |
| G3 | 432 | 461 | 14.05 |
| G4 | 432 | 459 | 15.40 |
| G5 | 437 | 477 | 12.88 |

To form the exemplary dielectric paste compositions, raw materials, as set forth in Table 3 below in weight percent of the paste, were batched and mixed using a planetary mixer. The vehicle was formed of a mixture of alpha terpineol and ethyl cellulose. The plasticizer was propanol oxybis-dibenzoate, and the surfactant was formed of SOLSPERSE® 41000. Once a homogeneous mixture was formed, the paste was triple roll milled. The fineness of the grind of the paste was measured periodically during the milling process using a FOG or Hegman gage. The desired fineness of grind is a $4^{th}$ streak and 50% value of less than 10 μm.

TABLE 3

Exemplary Paste Compositions P1-P5

|  | P1 | P2 | P3 | P4 | P5 |
|---|---|---|---|---|---|
| G1 | 65.53 | — | — | — | — |
| G2 | — | 65.53 | — | — | — |
| G3 | — | — | 65.53 | — | — |
| G4 | — | — | — | 65.53 | — |
| G5 | — | — | — | — | 65.53 |
| Vehicle | 21.74 | 21.74 | 21.74 | 21.74 | 21.74 |
| Surfactant | 1.75 | 1.75 | 1.75 | 1.75 | 1.75 |
| Plasticizer | 4 | 4 | 4 | 4 | 4 |
| Titania | 6.98 | 6.98 | 6.98 | 6.98 | 6.98 |

The resulting pastes were then printed through a 280 mesh screen (0.5 mil emulsion) onto an aluminum substrate. The wet printed paste was allowed to level for about 10 minutes. The paste was then dried at 150° C. for about 15 minutes and fired at 550° C. in air at a peak temperature for about 2-20 minutes (dependent on substrate size and particular application). The printing and firing process was then repeated two more times to create three fired layers having a total fired thickness of about 50-60 μm.

The breakdown voltage and insulation resistance of each exemplary paste was then measured according to the parameters set forth herein. The results are set forth in Table 4 below. The breakdown voltage is provided in Volts and Volts per mil.

TABLE 4

Electrical Performance of Exemplary Pastes P1-P5

| | Breakdown Voltage (V) | Breakdown Voltage (V/mil) | Insulation Resistance ($10^9$ Ω) |
|---|---|---|---|
| P1 | 3537 | 1769 | 26.81 |
| P2 | 3077 | 1539 | 4.68 |
| P3 | 2326 | 1163 | 7.06 |
| P4 | 2229 | 1115 | 6.20 |
| P5 | 3479 | 1740 | 47.28 |

As shown in Table 4, each of the exemplary paste compositions exhibited acceptable breakdown voltage and insulation resistance according to industry standards.

Example 2

Three of the exemplary pastes from example 1 were then selected for aging testing. The substrates with pastes P1-P3 were subjected to elevated temperature and humidity (85° C./85% relative humidity), and the adhesion and electrical performance was tested at different time intervals, according to the parameters set forth herein. The data is set forth in Table 5 below.

TABLE 5

Performance of P1-P3 during Elevated Humidity/Thermal Aging

| | P1 | | P2 | | P3 | |
|---|---|---|---|---|---|---|
| | 85/85 | Thermal Aging | 85/85 | Thermal Aging | 85/85 | Thermal Aging |
| Insulation Resistance (GΩ) | | | | | | |
| Initial | 69.20 | 69.20 | 1.42 | 1.42 | 17.16 | 17.16 |
| 48 hours | 89.11 | 85.79 | 90.75 | 109.09 | 88.41 | 81.13 |
| 250 hours | 82.78 | 94.50 | 112.09 | 93.95 | 111.28 | 98.76 |
| 500 hours | 91.71 | 75.50 | 76.51 | 73.14 | 93.36 | 92.52 |
| 750 hours | 113.71 | 98.68 | 67.05 | 100.73 | 94.79 | 99.46 |
| 1000 hours | 102.08 | 117.32 | 9.72 | 19.51 | 40.37 | 62.44 |
| Breakdown Voltage (V) | | | | | | |
| Initial | 3645.56 | 3645.56 | 2200.86 | 2200.86 | 2217.50 | 2217.50 |
| 48 hours | 3273.64 | 3518.64 | 1929.83 | 2389.60 | 2251.67 | 1727.50 |
| 250 hours | 3187.29 | 3846.43 | 2168.83 | 3289.67 | 1922.50 | 1707.50 |
| 500 hours | 3093.57 | 3761.36 | 3103.17 | 3322.50 | 2503.67 | 2373.17 |
| 750 hours | 3018.36 | 3518.71 | 2590.50 | 2284.33 | 2186.83 | 2003.50 |
| 1000 hours | 3566.07 | 3345.93 | 2603.67 | 1702.17 | 2541.26 | 1891.33 |
| Adhesion (lb-f) Ag Conductor on Dielectric | | | | | | |
| Initial | 3.55 | 3.55 | 3.54 | 3.54 | 3.50 | 3.50 |
| 48 hours | 4.87 | 2.44 | 3.87 | 4.46 | 5.00 | 6.06 |
| 250 hours | 4.52 | 2.02 | 4.41 | 4.81 | 2.89 | 1.09 |
| 500 hours | 4.14 | 1.78 | 5.75 | 3.92 | 2.73 | 3.59 |
| 750 hours | 4.05 | 2.54 | 3.35 | 3.96 | 2.60 | 3.60 |
| 1000 hours | 3.29 | 2.57 | 3.63 | 3.47 | 2.70 | 3.82 |

As shown in Table 5, P1 exhibited the best overall electrical performance while subjected to elevated temperature and humidity and thermal aging. The insulation resistance and breakdown voltage remained fairly consistent at each time interval. P1 also exhibited the best adhesion when subjected to elevated temperature and humidity. Further, P2 exhibited the most consistent adhesion results during thermal aging testing.

These and other advantages of the invention will be apparent to those skilled in the art from the foregoing specification. Accordingly, it will be recognized by those skilled in the art that changes or modifications may be made to the above described embodiments without departing from the broad inventive concepts of the invention. Specific dimensions of any particular embodiment are described for illustration purposes only. It should therefore be understood that this invention is not limited to the particular embodiments described herein, but is intended to include all changes and modifications that are within the scope and spirit of the invention.

The invention claimed is:

1. A dielectric glass composition suitable for use in an electronic device, the dielectric glass composition comprising one or more alkali metal oxides, silicon dioxide, bismuth oxide, vanadium oxide and aluminum oxide, wherein
   the one or more alkali metal oxides constitutes at least about 10 wt % and no more than about 35 wt % of the dielectric glass composition;
   silicon dioxide constitutes at least 30 wt % of the dielectric glass composition;
   bismuth oxide constitutes no more than 30 wt % of the dielectric glass composition;
   vanadium oxide constitutes between about 1 wt % and about 10 wt % of the dielectric glass composition; and
   aluminum oxide constitutes between about 0.1 wt % and about 5 wt % of the dielectric glass composition.

2. The dielectric glass composition according to claim 1, wherein the median particle size ($d_{50}$) of the glass composition is no more than about 5 μm, and the glass composition has a coefficient of thermal expansion of at least about 10 ppm/K and no more than about 25 ppm/K over a temperature range of 30-460° C.

3. The dielectric glass composition according to claim 1, further comprising one or more metal or metalloid oxides selected from the group consisting of boron oxide, titanium oxide, barium oxide, antimony oxide, zinc oxide, manganese oxide, tellurium oxide, and copper oxide.

4. The dielectric glass composition according to claim 1, having at least about 10 wt % and no more than about 20 wt % of the one or more alkali metal oxides, the one or more alkali metal oxides selected from sodium oxide, potassium oxide, lithium oxide, and any combination of any of the foregoing.

5. The dielectric glass composition according to claim 1 having a coefficient of thermal expansion of at least 12 ppm/K.

6. The dielectric glass composition according to claim 1 having a glass transition temperature of less than 470° C.

7. The dielectric glass composition according to claim 1 having a glass softening point of less than 500° C.

8. The dielectric glass composition according to claim 1, wherein the glass composition is lead-free.

9. A dielectric paste composition suitable for use in an electronic device, comprising: at least one dielectric glass composition according to claim 1; and an organic vehicle.

10. The dielectric paste composition according to claim 9, wherein the at least one dielectric glass composition is at least about 50 wt % of the paste composition, and no more than about 80 wt % of the paste composition, based upon 100% total weight of the dielectric paste composition.

11. The dielectric paste composition according to claim 9, further comprising titania, ceramic pigments, transition metal oxides, or combinations thereof, present in an amount of at least about 1 wt % of the paste composition, and no more than about 25 wt % of the paste composition, based upon 100% total weight of the dielectric paste composition.

12. The dielectric paste composition according to claim 9, wherein the organic vehicle is at least about 10 wt % of the paste composition, and no more than about 40 wt % of the paste composition, based upon 100% total weight of the dielectric paste composition.

13. The dielectric paste composition according to claim 9, wherein the at least one glass composition is provided in the form of particles having an median particle size ($d_{50}$) of at least about 1 µm and no more than about 10 µm.

14. A method comprising applying a dielectric paste composition according to claim 9 to at least one surface of a substrate.

15. The method according to claim 14, further comprising subjecting the dielectric composition to one or more thermal treatment steps including conventional oven drying, infrared or ultraviolet curing, and/or firing.

16. The method according to claim 15, wherein firing is performed in an air or nitrogen atmosphere at a temperature of less than 600° C. for aluminum substrates and less than 1000° C. for steel substrates.

17. An electronic device prepared by a method according to claim 14.

18. An electronic device comprising:
a substrate having at least one surface; and
a dielectric paste composition according to claim 9 applied to at least a portion of the at least one surface,
wherein the dielectric paste composition is subjected to one or more thermal treatment steps to form a dielectric layer.

19. The electronic device according to claim 18, wherein the device is selected from an electric circuit, a solar cell, an LED, a display, a capacitor, a resistor, and any combination thereof.

* * * * *